United States Patent
Qiao et al.

(10) Patent No.: US 12,175,867 B2
(45) Date of Patent: Dec. 24, 2024

(54) PREDICTION METHOD AND APPARATUS FOR AUTONOMOUS DRIVING MANUAL TAKEOVER, AND SYSTEM

(71) Applicant: HUAWEI TECHNOLOGIES CO., LTD., Guangdong (CN)

(72) Inventors: Dezhi Qiao, Beijing (CN); Yong Wu, Beijing (CN); Jianqin Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 113 days.

(21) Appl. No.: 17/961,108

(22) Filed: Oct. 6, 2022

(65) Prior Publication Data

US 2023/0049840 A1 Feb. 16, 2023

Related U.S. Application Data

(63) Continuation of application No. PCT/CN2020/084288, filed on Apr. 10, 2020.

(51) Int. Cl.
*G08G 1/0965* (2006.01)
*B60W 50/00* (2006.01)
(Continued)

(52) U.S. Cl.
CPC ....... *G08G 1/0965* (2013.01); *B60W 50/0097* (2013.01); *B60W 60/0053* (2020.02);
(Continued)

(58) Field of Classification Search
CPC ...... G08G 1/0965; G08G 1/161; G08G 1/166; G08G 1/0112; G08G 1/0141;
(Continued)

(56) References Cited

U.S. PATENT DOCUMENTS 10,134,278 B1 11/2018 Konrardy et al.
2016/0025505 A1 1/2016 Oh et al.
(Continued)

FOREIGN PATENT DOCUMENTS

CN 104837705 A 8/2015
CN 106080606 A 11/2016
(Continued)

OTHER PUBLICATIONS

Office Action in Japanese Appln. No. 2022-561395, mailed on Dec. 12, 2023, 10 pages (with English translation).
(Continued)

*Primary Examiner* — Daryl C Pope
(74) *Attorney, Agent, or Firm* — Fish & Richardson P.C.

(57) ABSTRACT

A prediction method and apparatus for an autonomous driving manual takeover, and a system are provided. One example method includes: A first vehicle sends a first message to a second vehicle when detecting that the first vehicle has a manual takeover requirement, where the first message includes information about a first location of the first vehicle, and the information about the first location is used to indicate a location of the first vehicle when the first vehicle detects that the first vehicle has the manual takeover requirement.

18 Claims, 8 Drawing Sheets

(51) Int. Cl.
  *B60W 60/00* (2020.01)
  *G08G 1/16* (2006.01)
(52) U.S. Cl.
  CPC ......... *B60W 60/0059* (2020.02); *G08G 1/161* (2013.01); *G08G 1/166* (2013.01); *B60W 2552/00* (2020.02); *B60W 2756/10* (2020.02)
(58) Field of Classification Search
  CPC ....... G08G 1/096775; G08G 1/096783; G08G 1/096791; G08G 1/164; B60W 50/0097; B60W 60/0053; B60W 60/0059; B60W 2552/00; B60W 2756/10; B60W 30/18154; B60W 2556/65
  See application file for complete search history.

(56) References Cited

U.S. PATENT DOCUMENTS

| | | | |
|---|---|---|---|
| 2016/0179092 | A1 | 6/2016 | Park |
| 2018/0284771 | A1 | 10/2018 | Ravichandran et al. |
| 2019/0186936 | A1 | 6/2019 | Ebner et al. |
| 2019/0243361 | A1 | 8/2019 | Yabuuchi et al. |
| 2019/0294167 | A1 | 9/2019 | Kutila et al. |
| 2020/0317216 | A1* | 10/2020 | Konrardy ............ B60W 30/182 |
| 2023/0074288 | A1* | 3/2023 | Filippou ........... H04W 28/0236 |

FOREIGN PATENT DOCUMENTS

| | | |
|---|---|---|
| CN | 106444733 A | 2/2017 |
| CN | 107097780 A | 8/2017 |
| CN | 108263384 A | 7/2018 |
| CN | 108674415 A | 10/2018 |
| CN | 108819945 A | 11/2018 |
| CN | 109353347 A | 2/2019 |
| CN | 109844833 A | 6/2019 |
| CN | 110027468 A | 7/2019 |
| CN | 110371132 A | 10/2019 |
| CN | 110825077 A | 2/2020 |
| CN | 110888434 A | 3/2020 |
| JP | 2016028927 A | 3/2016 |
| JP | 2017117092 A | 6/2017 |
| JP | 2017146933 A | 8/2017 |
| JP | 2017168038 A | 9/2017 |

OTHER PUBLICATIONS

Office Action in Chinese Appln. No. 202080004983.X, dated Aug. 27, 2021, 30 pages (with English translation).

Partial Supplementary European Search Report in European Appln No. 20929987.4, dated Apr. 18, 2023, 14 pages.

International Search Report and Written Opinion in International Appln. No. PCT/CN2020/084288, mailed on Jan. 14, 2021, 21 pages (with English translation).

Extended European Search Report in European Appln No. 20929987.4, dated Jun. 19, 2023, 18 pages.

Office Action in Japanese Appln. No. 2022-561395, mailed on May 21, 2024, 6 pages (with English translation).

* cited by examiner

PREDICTION METHOD AND APPARATUS FOR AUTONOMOUS DRIVING MANUAL TAKEOVER, AND SYSTEM

CROSS-REFERENCE TO RELATED APPLICATIONS

This application is a continuation of International Application No. PCT/CN2020/084288, filed on Apr. 10, 2020. The disclosure of which is hereby incorporated by reference in its entirety

TECHNICAL FIELD

This application relates to the autonomous driving field, and in particular, to a prediction method and apparatus for an autonomous driving manual takeover, and a system.

BACKGROUND

With development of an autonomous driving technology, autonomous vehicles gradually emerge in people's life, but it still takes several years or even more than 10 years for highly autonomous driving and fully autonomous driving to be implemented. During this period, a driver still needs to be in a driver's seat of an autonomous vehicle and get ready to take over the vehicle at any time, to deal with scenarios in which autonomous driving is not suitable.

In the conventional technology, a process of manually taking over a vehicle is as follows: After sensing an event occurrence or a complex scenario, an autonomous vehicle determines whether autonomous driving can continue; and when determining that autonomous driving cannot continue, the autonomous vehicle sends a manual takeover notification in a voice broadcast form or the like, to remind a driver to take over the vehicle. At this time, a current manual takeover event ends.

In the manual takeover processing method, when a vehicle other than the foregoing vehicle travels to a corresponding location, if the driver is not ready to take over the vehicle, a takeover delay may be caused. As a result, a possibility of an accident is increased, and safety is low.

SUMMARY

This application provides a prediction method and apparatus for an autonomous driving manual takeover, and a system, to implement manual takeover prediction and improve vehicle driving safety.

According to a first aspect, this application provides a prediction method for an autonomous driving manual takeover, including:

A first vehicle sends a first message to a second vehicle when detecting that the first vehicle has a manual takeover requirement. The first message includes information about a first location of the first vehicle, and the information about the first location is used to indicate a location of the first vehicle when the first vehicle detects that the first vehicle has the manual takeover requirement.

In a possible design, the information about the first location includes latitude and longitude of the first location.

In a possible design, when the first location is at an intersection, the information about the first location includes an identifier of the intersection.

In a possible design, when the first location is not at an intersection, the information about the first location includes an identifier of a road section in which the first location is located and a distance from a start point of the road section to the first location, or an identifier of a lane section in which the first location is located and a distance from a start point of the lane section to the first location.

In a possible design, the first message further includes an identifier type, and the identifier type includes a road type, a lane type, or an intersection type.

In a possible design, the first message further includes a manual takeover identification code.

In a possible design, the first message further includes a takeover type, and the takeover type includes a manual takeover induced by an event or a manual takeover induced by a traffic flow.

In a possible design, the first message further includes time at/in which the first vehicle has the manual takeover requirement.

According to a second aspect, the present invention provides a prediction method for an autonomous driving manual takeover. The method is applied to a server and includes:

The server receives a first message from a first vehicle. The first message includes information about a first location of the first vehicle and first time, the information about the first location is used to indicate a location of the first vehicle when the first vehicle detects that the first vehicle has a manual takeover requirement, and the first time is used to indicate time at which the first vehicle detects that the first vehicle has the manual takeover requirement.

The server determines, based on the information about the first location and the first time, a first probability that a manual takeover occurs in a first area in which the first location is located within a first time range within which the first time falls.

The server sends a second message to a second vehicle. The second message includes the first probability, and the second message is used to indicate that a probability that the manual takeover occurs in the first area within the first time range is the first probability.

In a possible design, the second message further includes information about the first area.

In a possible design, the information about the first location includes latitude and longitude of the first location, and the method further includes:
 determining, based on the latitude and the longitude of the first location, that the first area is an intersection; and
 obtaining coordinates of the intersection, where the information about the first area includes the coordinates of the intersection.

In a possible design, the information about the first location includes latitude and longitude of the first location, and the method further includes:
 determining, based on the latitude and the longitude of the first location, that the first area is a road section; and
 obtaining start point coordinates of the road section and end point coordinates of the road section, where the information about the first area includes the start point coordinates of the road section and the end point coordinates of the road section.

In a possible design, the second message further includes an area type, and the area type includes a road section type or an intersection type.

In a possible design, the information about the first location includes an identifier of an intersection, and the information about the first area includes the identifier of the intersection.

In a possible design, the information about the first location includes an identifier of a road section and a distance from a start point of the road section to the first location, and the information about the first area includes the identifier of the road section and a preset area range of the road section.

In a possible design, the information about the first location includes an identifier of a lane section and a distance from a start point of the lane section to the first location, and the information about the first area includes the identifier of the lane section and a preset area range of the lane section.

In a possible design, the second message further includes an identifier type, and the identifier type includes a road type, a lane type, or an intersection type.

In a possible design, the second message further includes a manual takeover probability identification code.

In a possible design, the second message further includes the first time range.

In a possible design, the method further includes:

The server sends a manual takeover probability dynamic layer to the second vehicle. The first area at the manual takeover probability dynamic layer is marked by using an identifier corresponding to the first probability.

According to a third aspect, this application provides a prediction method for an autonomous driving manual takeover, including:

receiving a second message from a server, where the second message includes a first probability that a manual takeover occurs in a first area in which a first location is located within a first time range within which first time falls, the first probability is determined by the server based on information about the first location and the first time, the information about the first location is used to indicate a location of a first vehicle when the first vehicle detects that the first vehicle has a manual takeover requirement, and the first time is used to indicate time at which the first vehicle detects that the first vehicle has the manual takeover requirement; and performing manual takeover prediction when the first probability is greater than a preset threshold.

In a possible design, the method further includes:

receiving a manual takeover probability dynamic layer from the server, where the first area at the manual takeover probability dynamic layer is marked by using an identifier corresponding to the first probability; and displaying the manual takeover probability dynamic layer.

According to a fourth aspect, this application provides a prediction apparatus for an autonomous driving manual takeover, including:

a detection module, configured to detect whether a first vehicle has a manual takeover requirement; and a sending module, configured to send a first message to a second vehicle when the detection module detects that the first vehicle has the manual takeover requirement, where the first message includes information about a first location of the first vehicle, and the information about the first location is used to indicate a location of the first vehicle when the detection module detects that the first vehicle has the manual takeover requirement.

In a possible design, the information about the first location includes latitude and longitude of the first location.

In a possible design, when the first location is at an intersection, the information about the first location includes an identifier of the intersection.

In a possible design, when the first location is not at an intersection, the information about the first location includes an identifier of a road section in which the first location is located and a distance from a start point of the road section to the first location, or an identifier of a lane section in which the first location is located and a distance from a start point of the lane section to the first location.

In a possible design, the first message further includes an identifier type, and the identifier type includes a road type, a lane type, or an intersection type.

In a possible design, the first message further includes a manual takeover identification code.

In a possible design, the first message further includes a takeover type, and the takeover type includes a manual takeover induced by an event or a manual takeover induced by a traffic flow.

In a possible design, the first message further includes time at/in which the first vehicle has the manual takeover requirement.

According to a fifth aspect, this application provides a prediction apparatus for an autonomous driving manual takeover, including:

a receiving module, configured to receive a first message from a first vehicle, where the first message includes information about a first location of the first vehicle and first time, the information about the first location is used to indicate a location of the first vehicle when the first vehicle detects that the first vehicle has a manual takeover requirement, and the first time is used to indicate time at which the first vehicle detects that the first vehicle has the manual takeover requirement;

a determining module, configured to determine, based on the information about the first location and the first time, a first probability that a manual takeover occurs in a first area in which the first location is located within a first time range within which the first time falls; and a sending module, configured to send a second message to a second vehicle, where the second message includes the first probability, and the second message is used to indicate that a probability that the manual takeover occurs in the first area within the first time range is the first probability.

In a possible design, the second message further includes information about the first area.

In a possible design, the information about the first location includes latitude and longitude of the first location, and the determining module is further configured to:

determining, based on the latitude and the longitude of the first location, that the first area is an intersection; and obtaining coordinates of the intersection, where the information about the first area includes the coordinates of the intersection.

In a possible design, the information about the first location includes latitude and longitude of the first location, and the determining module is further configured to:

determining, based on the latitude and the longitude of the first location, that the first area is a road section; and obtaining start point coordinates of the road section and end point coordinates of the road section, where the information about the first area includes the start point coordinates of the road section and the end point coordinates of the road section.

In a possible design, the second message further includes an area type, and the area type includes a road section type or an intersection type.

In a possible design, the information about the first location includes an identifier of an intersection, and the information about the first area includes the identifier of the intersection.

In a possible design, the information about the first location includes an identifier of a road section and a distance from a start point of the road section to the first location, and the information about the first area includes the identifier of the road section and a preset area range of the road section.

In a possible design, the information about the first location includes an identifier of a lane section and a distance from a start point of the lane section to the first location, and the information about the first area includes the identifier of the lane section and a preset area range of the lane section.

In a possible design, the second message further includes an identifier type, and the identifier type includes a road type, a lane type, or an intersection type.

In a possible design, the second message further includes a manual takeover probability identification code.

In a possible design, the second message further includes the first time range.

In a possible design, the sending module is further configured to send a manual takeover probability dynamic layer to the second vehicle, where the first area at the manual takeover probability dynamic layer is marked by using an identifier corresponding to the first probability.

According to a sixth aspect, this application provides a prediction apparatus for an autonomous driving manual takeover, including:

a receiving module, configured to receive a second message from a server, where the second message includes a first probability that a manual takeover occurs in a first area in which a first location is located within a first time range within which first time falls, the first probability is determined by the server based on information about the first location and the first time, the information about the first location is used to indicate a location of a first vehicle when the first vehicle detects that the first vehicle has a manual takeover requirement, and the first time is used to indicate time at which the first vehicle detects that the first vehicle has the manual takeover requirement; and a prediction module, configured to perform manual takeover prediction when the first probability is greater than a preset threshold.

In a possible design, the apparatus further includes a display module.

The receiving module is further configured to receive a manual takeover probability dynamic layer from the server, where the first area at the manual takeover probability dynamic layer is marked by using an identifier corresponding to the first probability.

The display module is configured to display the manual takeover probability dynamic layer.

According to a seventh aspect, this application provides a chip, a memory, and a processor.

The memory is configured to store program instructions, and the processor is configured to invoke the program instructions in the memory to perform the method according to the first aspect, the method according to the second aspect, or the method according to the third aspect.

According to an eighth aspect, this application provides a vehicle, including a memory and a processor.

The memory is configured to store program instructions, and the processor is configured to invoke the program instructions in the memory to perform the method according to the first aspect.

According to a ninth aspect, this application provides a vehicle, including a memory and a processor.

The memory is configured to store program instructions, and the processor is configured to invoke the program instructions in the memory to perform the method according to the third aspect.

According to a tenth aspect, this application provides a server, including a memory and a processor.

The memory is configured to store program instructions, and the processor is configured to invoke the program instructions in the memory to perform the method according to the second aspect.

According to an eleventh aspect, this application provides a prediction system, including the vehicle according to the eighth aspect, the vehicle according to the ninth aspect, and/or the server according to the tenth aspect.

According to the prediction method and apparatus for the autonomous driving manual takeover and the system that are provided in embodiments, the first vehicle sends the first message to the second vehicle when detecting that the first vehicle has the manual takeover requirement, where the first message may include the information about the first location when the first vehicle detects that the first vehicle has the manual takeover requirement, and the first message may be used to notify the second vehicle that the first vehicle has the manual takeover requirement at the first location, so that after receiving the first message, the second vehicle may notify a driver of the second vehicle in advance that the vehicle may need to be manually taken over at the first location. In this way, the driver can get ready to take over the vehicle in advance, thereby improving vehicle driving safety.

DESCRIPTION OF EMBODIMENTS

To make the objectives, technical solutions, and advantages of this application clearer, the following clearly and completely describes the technical solutions of this application with reference to the accompanying drawings in this application. It is clearly that the described embodiments are merely some rather than all of embodiments of this application. All other embodiments obtained by a person of ordinary skill in the art based on embodiments of this application without creative efforts shall fall within the protection scope of this application.

In this application, it should be noted that terms "first" and "second" are merely used for description, but cannot be understood as indicating or implying relative importance. In addition, "at least one" means one or more, and "a plurality of" means two or more. "And/or" describes an association relationship between associated objects, and represents that three relationships may exist. For example, A and/or B may represent that only A exists, both A and B exist, and only B exists. A and B each may be singular or plural. The character "/" generally indicates an "or" relationship between associated objects. "At least one of the following items (pieces)" or a similar expression thereof indicates any combination of these items, including a single item (piece) or any combination of a plurality of items (pieces). For example, at least one item (piece) of a, b, or c may represent: only a, only b, only c, a combination of a and b, a combination of a and c, a combination of b and c, or a combination of a, b, and c, where a, b, and c each may be singular or plural.

Figure 1:
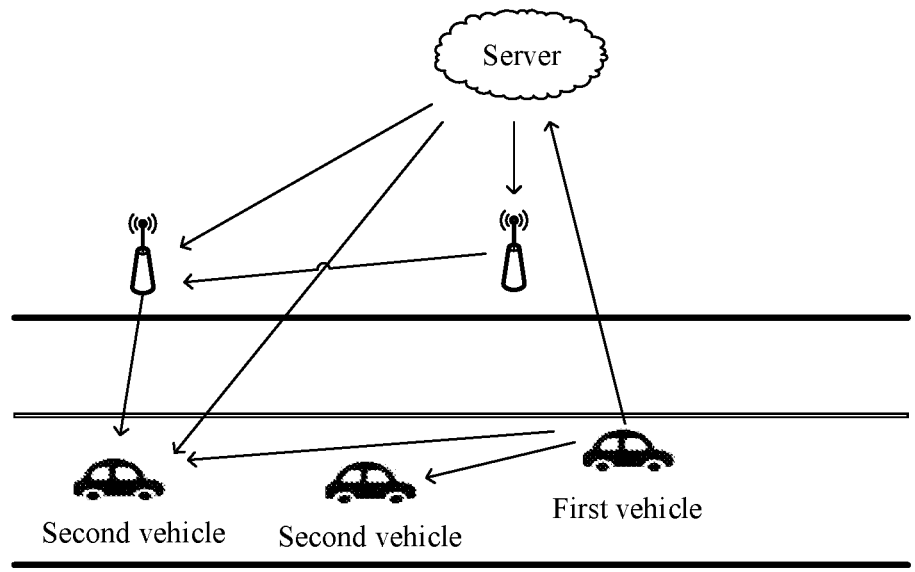
FIG. 1 is a framework diagram of a system according to this application.

FIG. 1 is a framework diagram of a system according to this application. The system shown in FIG. 1 includes terminal devices, a server, and roadside devices. Any two of the terminal devices, the server, and the roadside devices may be connected by using an existing wireless communications technology, for example, Bluetooth, wireless broadband, global system for mobile communications, or short wave communications.

The terminal devices include but are not limited to an autonomous driving system in a vehicle, a mobile terminal in a vehicle, a vehicle, and another processing device that can implement a corresponding function in this application. That the terminal devices are vehicles is used for illustration in FIG. 1, and the following uses an example in which the terminal devices are vehicles to describe solutions of this application. It should be noted that a solution derived when steps performed by the vehicles are performed by terminal devices other than the vehicles also falls within the protection scope of this application. The server may be a server configured to store and deliver a high-precision map in the autonomous driving field. The roadside devices include but are not limited to a base transceiver station (BTS for short) in global system for mobile communications (GSM for short) or code division multiple access (CDMA for short), a NodeB (NB for short) in wideband code division multiple access (WCDMA for short), an evolved NodeB (eNB for short), an access point (AP), and a relay node in an LTE network, a gNB, a micro base station, a mobile micro base station, and a roadside unit (RSU) in a 5G network or an NR network, and another device that can implement a corresponding function in this application.

It should be noted that a quantity of vehicles and a quantity of roadside devices shown in FIG. 1 are merely examples. The quantity of vehicles is not limited to three in FIG. 1, and the quantity of roadside devices is not limited to two in FIG. 1. FIG. 1 does not constitute any limitation on this application.

In the conventional technology, when a first vehicle in FIG. 1 determines that autonomous driving cannot continue in a current driving environment, the first vehicle sends a manual takeover notification in a voice broadcast form or the like, to remind a driver of the vehicle to take over the vehicle. At this time, a current manual takeover event of the first vehicle ends. In the existing manual takeover processing method, a second vehicle in FIG. 1 cannot sense the manual takeover event of the first vehicle, and when the second vehicle travels to a corresponding location, if a driver is not ready to take over the vehicle, a takeover delay may be caused. As a result, a possibility of an accident is increased, and safety is reduced.

Based on the foregoing technical problem in the conventional technology, this application proposes a prediction method for an autonomous driving manual takeover. When detecting that the first vehicle has a manual takeover requirement, the first vehicle sends a manual takeover notification in a voice broadcast form or the like, to remind the driver of the vehicle to take over the vehicle; and further sends a first message to the second vehicle, where the first message may include information about a first location when the first vehicle detects that the first vehicle has the manual takeover requirement, so that after receiving the first message, the second vehicle may notify the driver of the second vehicle in advance that the vehicle may need to be manually taken over at the first location. In this way, the driver can get ready to take over the vehicle in advance, thereby improving vehicle driving safety.

It should be noted that when detecting that the first vehicle has the manual takeover requirement, the first vehicle may send the manual takeover notification before sending the first message, send the manual takeover notification and the first message simultaneously, or send the first message before sending the manual takeover notification. A sequence of the first message and the manual takeover notification is not limited in this application.

Figure 2:
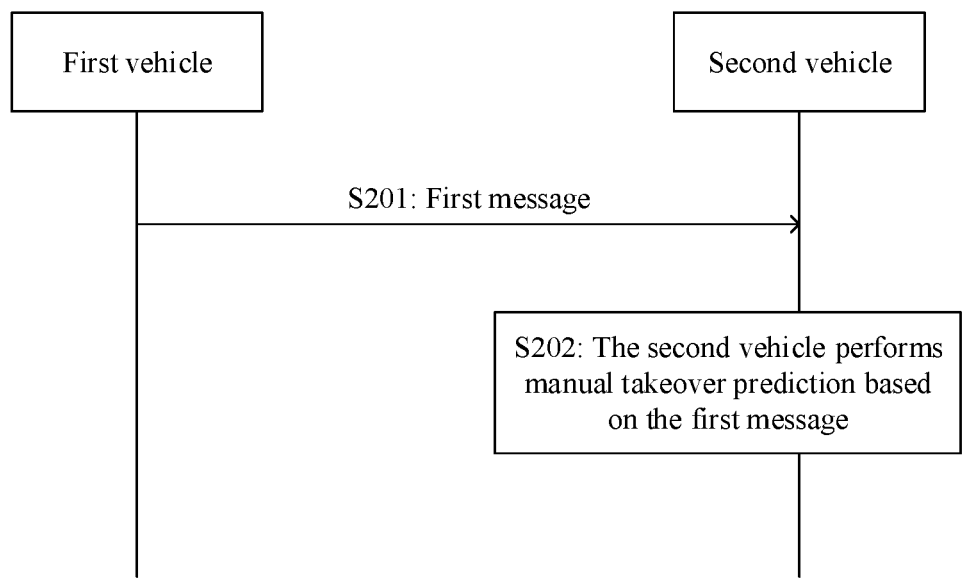
FIG. 2 is a schematic flowchart of Embodiment 1 of a prediction method for an autonomous driving manual takeover according to this application.

Based on the system framework shown in FIG. 1, FIG. 2 is a schematic flowchart of Embodiment 1 of a prediction method for an autonomous driving manual takeover according to this application. As shown in FIG. 2, the prediction method for the autonomous driving manual takeover provided in this embodiment includes the following steps.

S201: The first vehicle sends a first message to the second vehicle when detecting that the first vehicle has a manual takeover requirement.

Step S201 may be performed by the first vehicle shown in FIG. 1. The first vehicle determines whether a current driving environment is suitable for continuing autonomous driving. If a determining result is that the current driving environment is unsuitable for continuing autonomous driving, it indicates that the first vehicle has the manual takeover requirement.

In a possible implementation, a sensor configured to sense a surrounding driving environment may be installed on the first vehicle. The sensor determines the sensed driving environment in real time; and when complexity of the driving environment exceeds a degree that can be processed by autonomous driving, determines that the current driving environment is unsuitable for continuing autonomous driving.

Optionally, the sensor configured to sense the surrounding driving environment may be a camera, may be a radar, or may be another prior-art device capable of sensing a driving environment. Examples are not provided one by one in this application.

The second vehicle may be all vehicles except the first vehicle, or may be a vehicle that is other than the first vehicle and whose distance to a first location falls within a preset range.

Specifically, the first message sent by the first vehicle to the second vehicle includes information about the first location of the first vehicle, and the information about the first location is used to indicate a location of the first vehicle when the first vehicle detects that the first vehicle has the manual takeover requirement. After receiving the first message, the second vehicle may notify a driver of the second vehicle in advance that the vehicle may need to be manually taken over at the first location. In this way, the driver can get ready to take over the vehicle in advance, thereby improving vehicle driving safety.

The following describes two possible formats of the first message sent by the first vehicle to the second vehicle.

In a possible implementation, as listed in Table 1, the information about the first location may include latitude and longitude of the first location.

Optionally, as listed in Table 1, the first message may further include a manual takeover identification code.

Optionally, as listed in Table 1, the first message may further include a takeover type, and the takeover type includes a manual takeover induced by an event or a manual takeover induced by a traffic flow.

Specifically, the first vehicle has a capability of sensing complexity of a traffic flow in the driving environment. For example, the complexity of the traffic flow may be sensed by using a camera or a radar installed on the first vehicle. When autonomous driving cannot continue because the first vehicle senses that the traffic flow in the current driving environment is excessively complex, for example, there are a large quantity of surrounding vehicles and pedestrians or vehicle flow and pedestrian flow statuses are complex, it is determined that the current takeover type is a manual takeover induced by a traffic flow. The first vehicle determines, as a manual takeover induced by an event, a takeover type of a manual takeover caused by a factor other than the manual takeover induced by a traffic flow. The event may be a traffic accident, traffic control, traffic police command, bad weather, road water accumulation, road snow accumulation, road surface rockfalls, or the like.

Optionally, as listed in Table 1, the first message may further include time at/in which the first vehicle has the manual takeover requirement.

The time at/in which the first vehicle has the manual takeover requirement may be first time at which the first vehicle detects that the first vehicle has the manual takeover requirement, or may be a time period in which the first time is a start point. Duration of the time period may be set depending on an actual requirement.

Specifically, the first time may be represented by a month and may be accurate to minutes, for example, xx hour xx minutes on xx month xx day.

Optionally, as listed in Table 1, the first message may further include field names such as an identification code field, a longitude field, a latitude field, a takeover type field, and an occurrence time field. The manual takeover identification code in the first message may be placed after the identification code field; the longitude of the first location may be placed after the longitude field; the latitude of the first location may be placed after the latitude field; the takeover type determined by the first vehicle may be placed after the takeover type field; and the time at/in which the first vehicle has the manual takeover requirement may be placed after the occurrence time field. It should be noted that this design is merely an example and various types of information included in the first message may be alternatively stored in another manner, provided that the second vehicle can identify meanings of the various types of information after receiving the first message.

TABLE 1

| Field name | Description |
| --- | --- |
| Identification code | Manual takeover identification code |
| B | Latitude |
| L | Longitude |
| Takeover type | Event-based or traffic flow-based |
| Occurrence time | Represented by a month and accurate to minutes |

Table 2 is an example of a design format of the first message in this implementation. In this example, the first message sent by the first vehicle to the second vehicle includes the manual takeover identification code, the longitude of the first location, the latitude of the first location, the takeover type, and the time at/in which the first vehicle has the manual takeover requirement.

The manual takeover identification code is represented by 101. The longitude is measured in degrees with five decimal places reserved. The latitude is measured in degrees with five decimal places reserved. The manual takeover induced by an event is represented by 01, and the manual takeover induced by a traffic flow is represented by 02. The time at/in which the first vehicle has the manual takeover requirement is the first time. The first time is represented by a month and is accurate to minutes by using a 24-hour system.

TABLE 2

| Field name | Description |
| --- | --- |
| Identification code | 101: manual takeover identification code |
| B | xx.xxxxx measured in degrees with five decimal places reserved |
| L | xxx.xxxxx measured in degrees with five decimal places reserved |
| Takeover type | 01: event<br>02: traffic flow |
| Occurrence time | xx hour xx minutes on xx month xx day using a 24-hour system |

In another possible implementation, as listed in Table 3, when the first location is at an intersection, the information about the first location includes an identifier of the intersection, which is represented by using an intersection ID in Table 3.

When the first location is not at an intersection, the information about the first location may be an identifier of a road section and a distance from a start point of the road section to the first location, or an identifier of a lane section and a distance from a start point of the lane section to the first location. In Table 3, a road linkID is used to represent the identifier of the road section, a distance from a start point of a road link to an event occurrence point is used to represent the distance from the start point of the road section to the first location, a lane linkID is used to represent the identifier of the lane section, and a distance from a start point of a lane link to the event occurrence point is used to represent the distance from the start point of the lane section to the first location.

Optionally, as listed in Table 3, the first message may further include an identifier type, and the identifier type includes a road type, a lane type, or an intersection type. When the first location is at an intersection, the identifier type in the first message sent by the first vehicle to the second vehicle is the intersection type. When the first location is not at an intersection, the identifier type in the first message sent by the first vehicle to the second vehicle is the road type or the lane type.

Optionally, as listed in Table 3, the first message may further include a manual takeover identification code.

Optionally, as listed in Table 3, the first message may further include a takeover type, and the takeover type is a manual takeover induced by an event or a manual takeover induced by a traffic flow.

Specifically, for a manner in which the first vehicle determines the takeover type, refer to the foregoing descriptions. Details are not described in this application again.

Optionally, as listed in Table 3, the first message may further include time at/in which the first vehicle has the manual takeover requirement. The time at/in which the first vehicle has the manual takeover requirement may be first time at which the first vehicle detects that the first vehicle has the manual takeover requirement, or may be a time period in which the first time is a start point. Duration of the time period may be set depending on an actual requirement.

Specifically, the first time may be represented by a month and may be accurate to minutes, for example, xx hour xx minutes on xx month xx day.

Optionally, as listed in Table 3, the first message may further include field names such as an identification code field, an identifier field, an identifier type field, a dist field, a takeover type field, and an occurrence time field. The manual takeover identification code in the first message may be placed after the identification code field; the intersection ID, the road linkID, or the lane linkID may be placed after the identifier field; the road type, the lane type, or the intersection type may be placed after the identifier type field; the distance from the start point of the road link to the event occurrence point or the distance from the start point of the lane link to the event occurrence point may be placed after the dist field, where a value of the dist field is 0 by default and is valid when the identifier type is the road type or the lane type; the takeover type determined by the first vehicle may be placed after the takeover type field; and the time at/in which the first vehicle has the manual takeover requirement may be placed after the occurrence time field. It should be noted that this design is merely an example and various types of information included in the first message may be alternatively stored in another manner, provided that the second vehicle can identify meanings of the various types of information after receiving the first message.

TABLE 3

| Field name | Description |
| --- | --- |
| Identification code | Manual takeover identification code |
| ID | Road linkID, lane linkID, or intersection ID |
| ID type | Three types: road, lane, and intersection |
| dist | Valid when the ID type is the road type or the lane type, and indicative of the distance from the start point of the lane link or the start point of the road link to the event occurrence point |

TABLE 3-continued

| Field name | Description |
| --- | --- |
| Takeover type | Two types: event and traffic flow |
| Occurrence time | Represented by a month and accurate to minutes |

Table 4 is an example of a design format of the first message in this implementation. In this example, the first message sent by the first vehicle to the second vehicle includes the manual takeover identification code, the intersection ID, the road linkID, or the lane linkID of the first location, the distance from the start point of the lane link or the start point of the road link to the event occurrence point, the identifier type, the takeover type, and the time at/in which the first vehicle has the manual takeover requirement.

The manual takeover identification code is represented by 101. The intersection ID is represented by an intersection ID in a high-precision map, the road ID is represented by a road linkID in the high-precision map, and the lane ID is represented by a lane linkID in the high-precision map. The intersection type is represented by 01, the lane type is represented by 02, and the road type is represented by 03. The distance from the start point of the lane link or the start point of the road link to the event occurrence point is accurate to 0.1 meters. The manual takeover induced by an event is represented by 01, and the manual takeover induced by a traffic flow is represented by 02. The time at/in which the first vehicle has the manual takeover requirement is the first time. The first time is represented by a month and is accurate to minutes by using a 24-hour system.

TABLE 4

| Field name | Description |
| --- | --- |
| Identification code | 101: manual takeover identification code |
| ID | Road linkID, lane linkID, or intersection ID in the high-precision map |
| ID type | 01: intersection<br>02: lane<br>03: road |
| DIST | 0 by default and accurate to 0.1 meters<br>(Note: valid when the ID type is represented by 02 or 03, and indicative of the distance from the start point of the lane link or the start point of the road link to the event occurrence point) |
| Takeover type | 01: event<br>02: traffic flow |
| Occurrence time | xx hour xx minutes on xx month xx day using a 24-hour system |

The following describes possible implementations in which the first vehicle sends the first message to the second vehicle.

Figure 3:
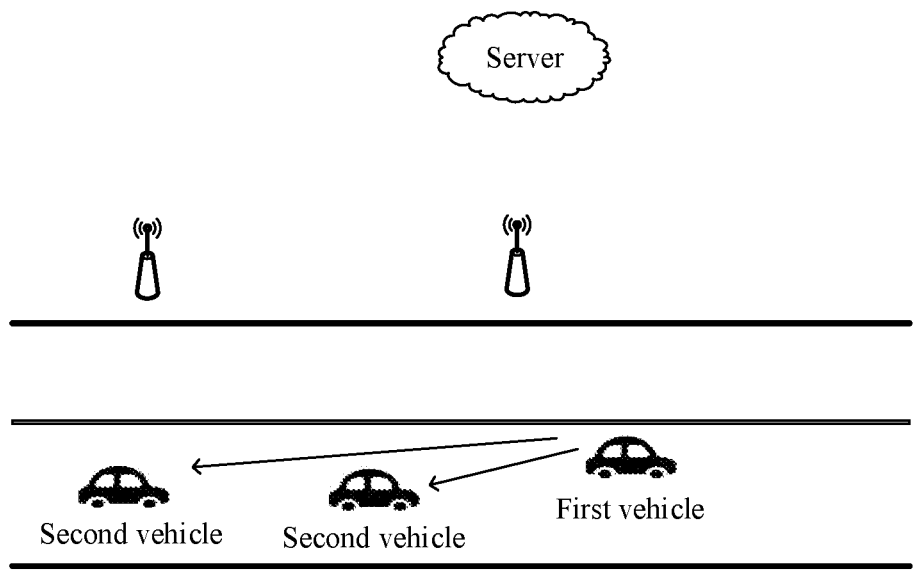
FIG. 3 is a schematic diagram 1 of sending a first message by a first vehicle according to this application.

In a possible implementation, as shown in FIG. 3, the first vehicle may directly send the first message to the second vehicle.

Figure 4:
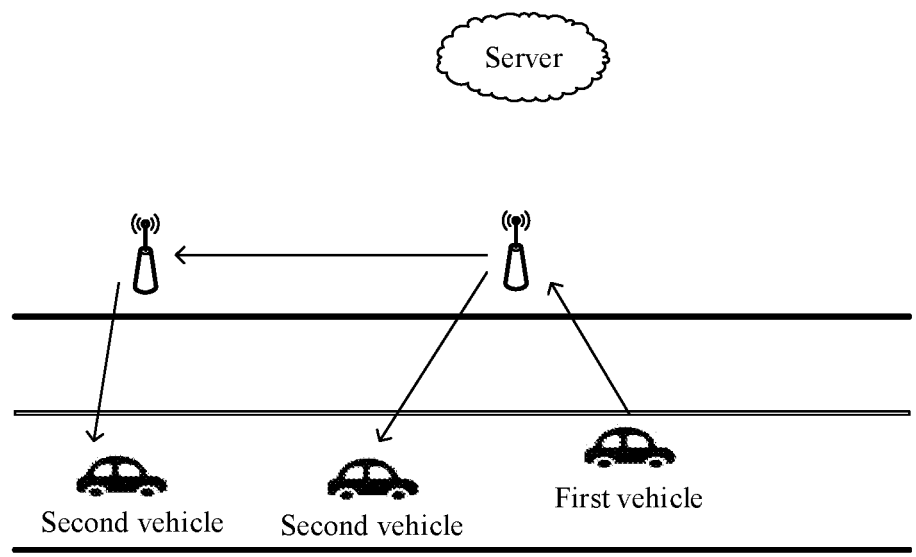
FIG. 4 is a schematic diagram 2 of sending a first message by a first vehicle according to this application.

In another possible implementation, as shown in FIG. 4, the first vehicle may forward the first message to the second vehicle by using one or more roadside devices RSUs.

Figure 5:
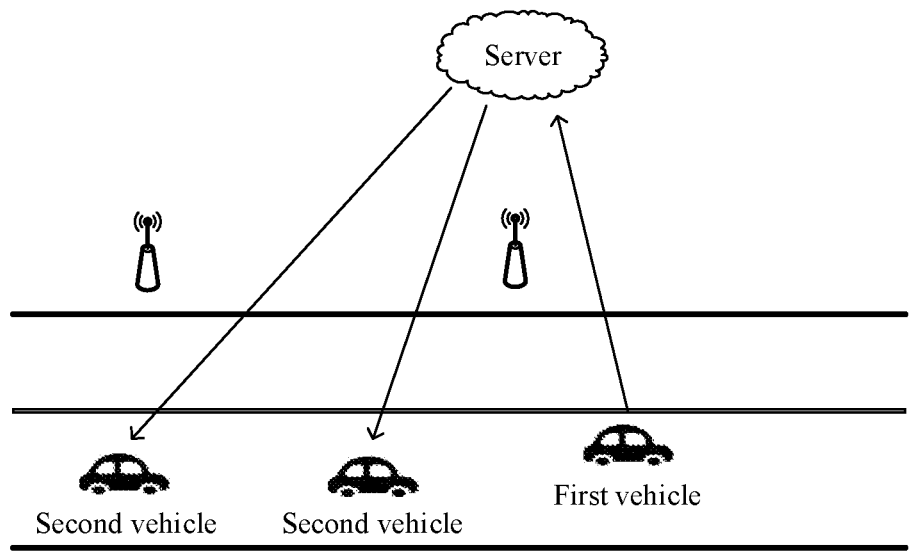
FIG. 5 is a schematic diagram 3 of sending a first message by a first vehicle according to this application.

In still another possible implementation, as shown in FIG. 5, the first vehicle may forward the first message to the second vehicle by using the server.

To enable the driver of the second vehicle to see the first location on the map, the server may generate a manual takeover event dynamic layer based on the information about the first location after receiving the first message, where the first location at the manual takeover event dynamic layer may be marked by using a preset pattern or text. The server further sends the manual takeover event dynamic layer to the second vehicle, and the second vehicle may display the manual takeover event dynamic layer on a human-machine interaction interface, so that the driver of the second vehicle can see the first location on the map, thereby improving user experience.

Figure 6:
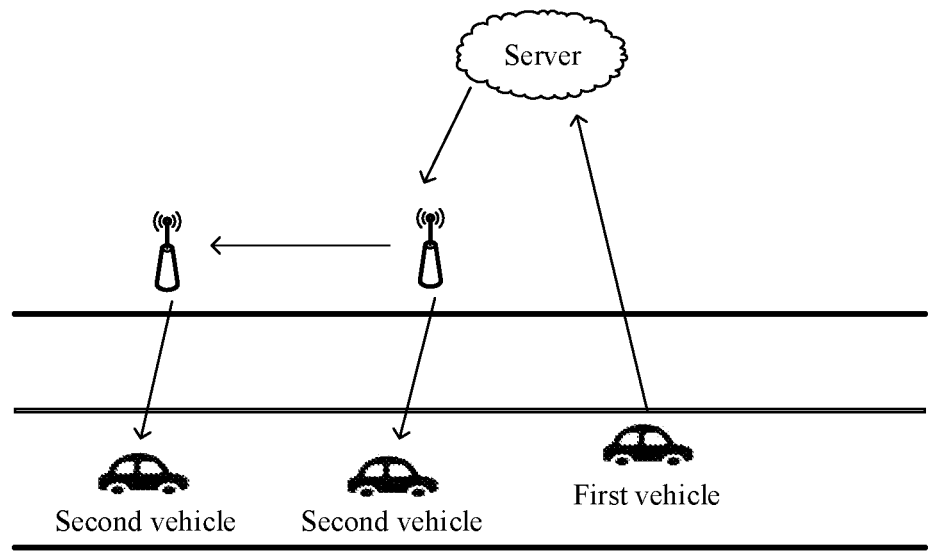
FIG. 6 is a schematic diagram 4 of sending a first message by a first vehicle according to this application.

In yet another possible implementation, as shown in FIG. 6, the first vehicle may forward the first message to the second vehicle by using the server and a plurality of roadside devices RSUs.

S202: The second vehicle performs manual takeover prediction based on the first message.

Specifically, after receiving the first message, the second vehicle may send the manual takeover prediction in a voice broadcast form or the like, to remind the driver of the vehicle that the manual takeover requirement may exist at the first location. In this way, the driver gets ready for the takeover in advance, thereby improving driving safety.

According to the prediction method for the autonomous driving manual takeover provided in this embodiment, the first vehicle sends the first message to the second vehicle when detecting that the first vehicle has the manual takeover requirement, where the first message may include the information about the first location when the first vehicle detects that the first vehicle has the manual takeover requirement, and the first message may be used to notify the second vehicle that the first vehicle has the manual takeover requirement at the first location, so that after receiving the first message, the second vehicle may notify the driver of the second vehicle in advance that the vehicle may need to be manually taken over at the first location. In this way, the driver can get ready to take over the vehicle in advance, thereby improving vehicle driving safety.

Figure 7:
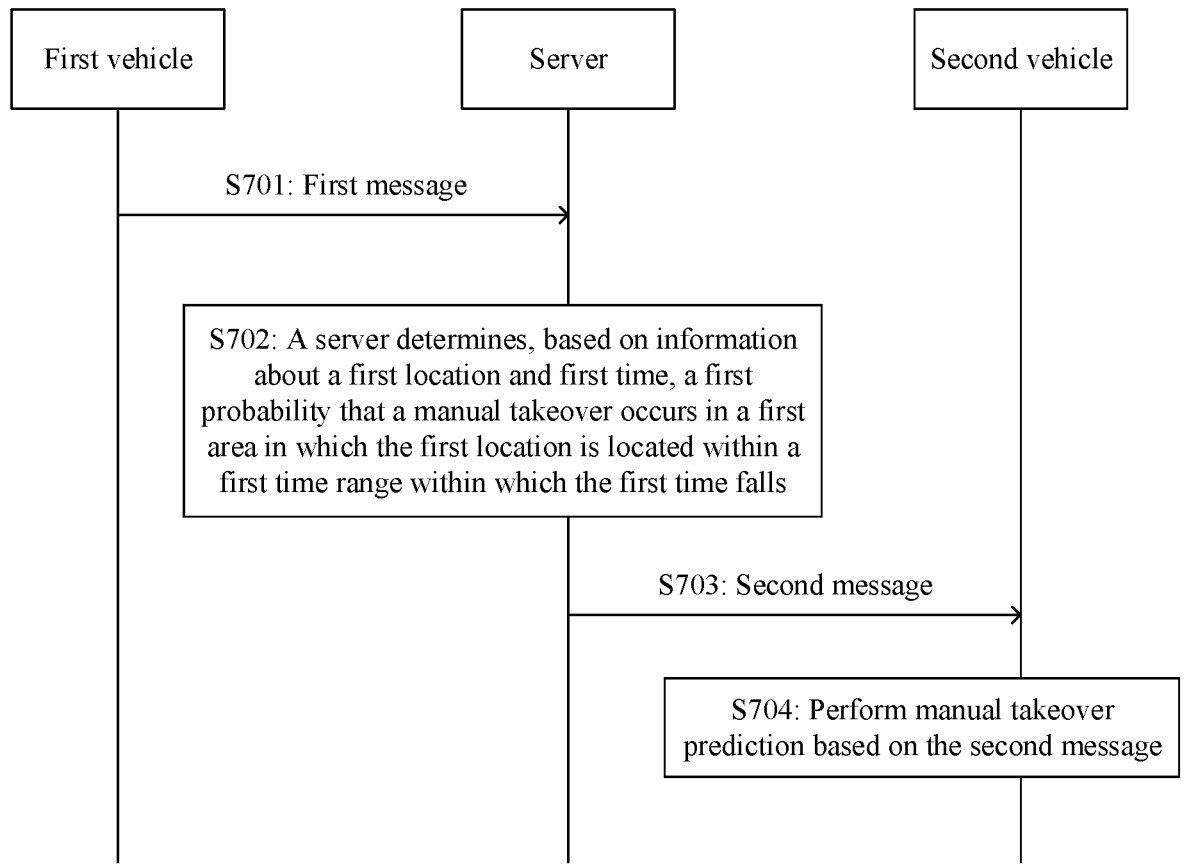
FIG. 7 is a schematic flowchart of Embodiment 2 of a prediction method for an autonomous driving manual takeover according to this application.

A difference between a manual takeover requirement induced by an event and a manual takeover requirement induced by a traffic flow is as follows: If the first vehicle has a manual takeover requirement at the first location and the manual takeover requirement is induced by an event, when the second vehicle travels to the first location, there is inevitably a manual takeover requirement provided that the event is not cleared. However, if the first vehicle has a manual takeover requirement at the first location and the manual takeover requirement is induced by a traffic flow, because vehicles and pedestrians are moving and the traffic flow changes at any time, when the second vehicle travels to the first location, the traffic flow may not affect the autonomous driving of the second vehicle. In this case, the second vehicle has no manual takeover requirement. Therefore, a probability that the manual takeover requirement exists at the first location may be delivered to the second vehicle. When the probability reaches a specific threshold, manual takeover prediction is performed. This avoids a problem of poor user experience caused by the manual takeover prediction that is still sent to the driver when the probability that the manual takeover requirement exists at the first location is low. Based on the system framework shown in FIG. 1, FIG. 7 is a schematic flowchart of Embodiment 2 of a prediction method for an autonomous driving manual takeover according to this application. As shown in FIG. 7, the prediction method for the autonomous driving manual takeover provided in this embodiment includes the following steps.

S701: The first vehicle sends a first message to the server when detecting that the first vehicle has a manual takeover requirement.

The first message includes information about a first location of the first vehicle and first time, the information about the first location is used to indicate a location of the first vehicle when the first vehicle detects that the first vehicle has the manual takeover requirement, and the first time is used to indicate time at which the first vehicle detects that the first vehicle has the manual takeover requirement.

Specifically, for a format of the first message sent by the first vehicle to the server, refer to the format of the first message sent by the first vehicle to the second vehicle in S201 in the foregoing embodiment. Details are not described in this application again.

S702: The server determines, based on the information about the first location and the first time, a first probability that a manual takeover occurs in a first area in which the first location is located within a first time range within which the first time falls.

Specifically, the first area in which the first location is located may be an intersection, or may be an area in a road section.

Specifically, a possible implementation of determining the first probability that the manual takeover occurs in the first area in which the first location is located within the first time range within which the first time falls includes the following cases:

If the first time is on a holiday, the first probability is determined based on a total quantity of passing vehicles in the first area in which the first location is located on the holiday and a total quantity of vehicles that are taken over in the total quantity of passing vehicles.

If the first time is on a non-holiday Monday, the first probability is determined based on a total quantity of passing vehicles in the first area in which the first location is located on the non-holiday Monday and a total quantity of vehicles that are taken over in the total quantity of passing vehicles.

If the first time is on a non-holiday Friday, the first probability is determined based on a total quantity of passing vehicles in the first area in which the first location is located on the non-holiday Friday and a total quantity of vehicles that are taken over in the total quantity of passing vehicles.

If the first time is on a non-holiday Saturday or a non-holiday Sunday, the first probability is determined based on a total quantity of passing vehicles in the first area in which the first location is located on the non-holiday Saturday or the non-holiday Sunday and a total quantity of vehicles that are taken over in the total quantity of passing vehicles.

If the first time is on one of a non-holiday Tuesday to a non-holiday Thursday, the first probability is determined based on a total quantity of passing vehicles in the first area in which the first location is located on the one of the non-holiday Tuesday to the non-holiday Thursday and a total quantity of vehicles that are taken over in the total quantity of passing vehicles.

Optionally, the probability may be determined once at an interval of a preset period, for example, the probability is determined once every hour.

For an area at a same intersection or in a same road section, a probability that a manual takeover occurs on a holiday is different from a probability that a manual takeover occurs on a non-holiday, and therefore the probabilities that the manual takeovers occur on a holiday and a non-holiday can be calculated separately. On non-holidays, a probability that a manual takeover occurs on a weekend is also different from a probability that a manual takeover occurs on a workday, and therefore the probabilities that the manual takeovers occur on a weekend and a workday can be calculated separately. Monday and Friday have their own characteristics. Therefore, probabilities can be calculated separately in three time periods: Monday, Friday, and Tuesday to Thursday. In this division manner, a probability obtained through statistics collection is more accurate, and manual takeover prediction performed by the second vehicle based on the probability is also more accurate.

S703: The server sends a second message to the second vehicle, where the second message includes the first probability.

The following describes two possible formats of the second message sent by the server to the second vehicle.

In a possible implementation, the second message further includes information about the first area.

As listed in Table 1, when the information about the first location in the first message includes latitude and longitude of the first location, whether the first area in which the first location is located is an intersection may be first determined based on the latitude and the longitude. If the first area is an intersection, coordinates of the intersection are obtained. As listed in Table 5, the information about the first area includes the coordinates of the intersection.

Optionally, as listed in Table 1, when the information about the first location in the first message includes latitude and longitude of the first location, whether the first area in which the first location is located is a road section may be first determined based on the latitude and the longitude. If the first area is a road section, start point coordinates of the road section and end point coordinates of the road section are obtained. As listed in Table 5, the information about the first area includes the start point coordinates of the road section and the end point coordinates of the road section.

Optionally, as listed in Table 5, the second message further includes an area type, and the area type includes a road section type or an intersection type. When it is determined, based on the latitude and the longitude in Table 1, that the first area in which the first location is located is an intersection, the area type in the second message sent by the server to the second vehicle is the intersection type. When it is determined, based on the latitude and the longitude in Table 1, that the first area in which the first location is located is a road section, the area type in the second message sent by the server to the second vehicle is the road section type.

Optionally, as listed in Table 5, the second message further includes a manual takeover probability identification code.

Optionally, as listed in Table 5, the second message further includes the first time range within which the first time falls. For example, the first time range is from 8:00 a.m. to 9:00 a.m. on a non-holiday Monday.

TABLE 5

| Field name | Description |
| --- | --- |
| Identification code | Manual takeover probability identification code |
| Area type | Two types: road section and intersection |
| Coordinates of an intersection | Coordinates of an intersection |
| Start point coordinates | Start point coordinates of a road section |
| End point coordinates | End point coordinates of the road section |

TABLE 5-continued

| Field name | Description |
| --- | --- |
| Time range | Set according to a specified time range rule |
| Takeover probability | Probability of a manual takeover in the road section or at the intersection within the current time range |

In another possible implementation, as listed in Table 6, when the information about the first location in the first message includes an identifier of an intersection, the information about the first area includes the identifier of the intersection.

Optionally, as listed in Table 6, when the information about the first location in the first message includes an identifier of a road section and a distance from a start point of the road section to the first location, the information about the first area includes the identifier of the road section and a preset area range of the road section. For example, if the road section in which the first location is located is further divided into three sections and each section is corresponding to one area, the preset area range is an area in which the first location in the road section is located.

Optionally, as listed in Table 6, when the information about the first location in the first message includes an identifier of a lane section and a distance from a start point of the lane section to the first location, the information about the first area includes the identifier of the lane section and a preset area range of the lane section. For example, if the lane section in which the first location is located is further divided into three sections and each section is corresponding to one area, the preset area range is an area in which the first location in the lane section is located.

Optionally, as listed in Table 6, the second message further includes an identifier type, and the identifier type includes a road type, a lane type, or an intersection type. The identifier type in the second message is the same as an identifier type in the first message sent by the first vehicle to the server.

Optionally, as listed in Table 6, the second message further includes a manual takeover probability identification code.

Optionally, as listed in Table 6, the second message further includes the first time range within which the first time falls. For example, the first time range is from 8:00 a.m. to 9:00 a.m. on a non-holiday Monday.

TABLE 6

| Field name | Description |
| --- | --- |
| Identification code | Manual takeover probability identification code |
| ID | Road, lane, or intersection ID |
| ID type | Three types: road, lane, and intersection |
| Interval | Valid when the ID type is the road type or the lane type, and indicative of a range in a lane link or a road link |
| Time range | Set according to a specified time range rule |
| Takeover probability | Probability of a manual takeover in a road section or at an intersection within the current time range |

To enable a driver of the second vehicle to intuitively learn the probability that the manual takeover occurs when the second vehicle travels to the first location, the server may mark the first area at a manual takeover probability dynamic layer by using an identifier corresponding to the first probability, and deliver the dynamic layer to the second vehicle while delivering the second message to the second vehicle. In this way, the driver of the second vehicle can intuitively learn, by using the identifier, the probability that the takeover occurs when the second vehicle travels to the first location, thereby improving user experience.

S704: The second vehicle performs manual takeover prediction based on the second message.

Specifically, after receiving the second message, the second vehicle may first determine whether the first probability in the second message exceeds a preset threshold. If the first probability exceeds the preset threshold, the second vehicle reminds, in a voice broadcast form or the like, the driver of the vehicle that the manual takeover may occur at the first location. In this way, the driver gets ready for the takeover in advance.

In a possible implementation, after receiving the second message, the second vehicle may replan a driving path of the second vehicle if determining that the probability value in the second message exceeds the preset threshold, to reduce a quantity of manual takeovers of the second vehicle.

In a possible implementation, the second vehicle may further receive the manual takeover probability dynamic layer from the server, and display the manual takeover probability dynamic layer on a human-machine interaction interface. The first area at the manual takeover probability dynamic layer is marked by using the identifier corresponding to the first probability, so that the driver of the second vehicle can intuitively learn, by using the identifier, the probability that the takeover occurs when the second vehicle travels to the first location, thereby improving user experience.

According to the prediction method for the autonomous driving manual takeover provided in this embodiment, after receiving the first message, the server determines, based on the first time at which the first vehicle detects that the first vehicle has the manual takeover requirement and the information about the first location when the first vehicle detects that the first vehicle has the manual takeover requirement, the first probability that the manual takeover occurs in the first area in which the first location is located within the first time range within which the first time falls; and adds the first probability to the second message and delivers the second message to the second vehicle. Then, after receiving the second message, the second vehicle may determine whether the first probability in the second message exceeds the preset threshold. If the first probability exceeds the preset threshold, the second vehicle reminds, in a voice broadcast form or the like, the driver of the vehicle that the manual takeover may occur at the first location. In this way, the driver gets ready for the takeover in advance, thereby improving driving safety.

Figure 8:
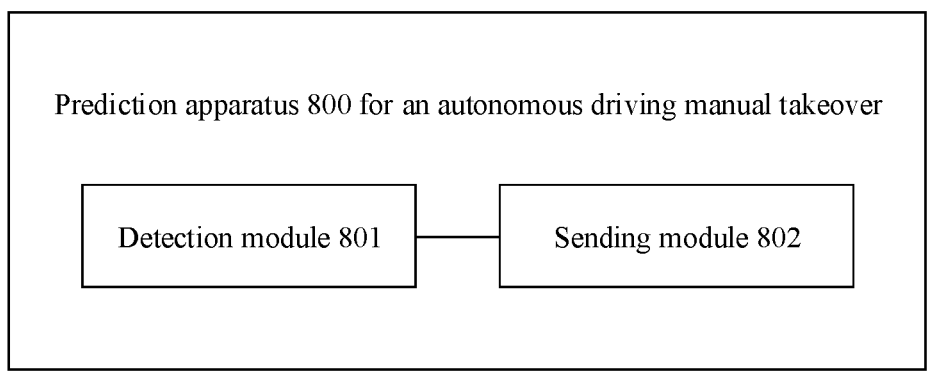
FIG. 8 is a schematic diagram of a structure of a prediction apparatus 800 for an autonomous driving manual takeover according to this application.

FIG. 8 is a schematic diagram of a structure of a prediction apparatus 800 for an autonomous driving manual takeover according to this application. The prediction apparatus 800 for the autonomous driving manual takeover provided in this application can be applied to the foregoing first vehicle. The prediction apparatus 800 for the autonomous driving manual takeover includes a detection module 801 and a sending module 802. The detection module 801 may be configured to detect whether the first vehicle has a manual takeover requirement. The sending module 802 may be configured to send a first message to a second vehicle when the detection module detects that the first vehicle has the manual takeover requirement, where the first message includes information about a first location of the first vehicle, and the information about the first location is used to indicate a location of the first vehicle when the detection module detects that the first vehicle has the manual takeover requirement.

Optionally, the information about the first location includes latitude and longitude of the first location.

Optionally, when the first location is at an intersection, the information about the first location includes an identifier of the intersection.

Optionally, when the first location is not at an intersection, the information about the first location includes an identifier of a road section in which the first location is located and a distance from a start point of the road section to the first location, or an identifier of a lane section in which the first location is located and a distance from a start point of the lane section to the first location.

Optionally, the first message further includes an identifier type, and the identifier type includes a road type, a lane type, or an intersection type.

Optionally, the first message further includes a manual takeover identification code.

Optionally, the first message further includes a takeover type, and the takeover type includes a manual takeover induced by an event or a manual takeover induced by a traffic flow.

Optionally, the first message further includes time at/in which the first vehicle has the manual takeover requirement.

The prediction apparatus for the autonomous driving manual takeover provided in this application may be configured to perform steps performed by the first vehicle in the foregoing method embodiments. An implementation principle and technical effects of the apparatus are similar to those in the foregoing method embodiments. Details are not described in this application again.

Figure 9:
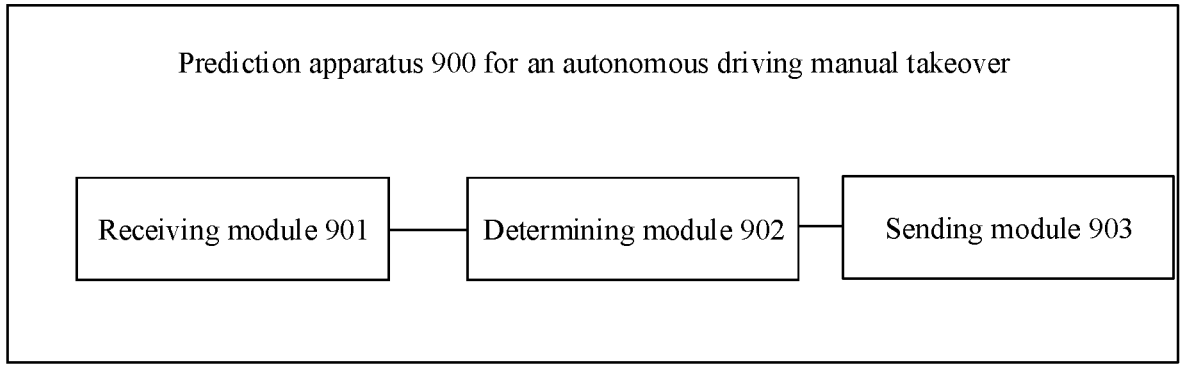
FIG. 9 is a schematic diagram of a structure of a prediction apparatus 900 for an autonomous driving manual takeover according to this application.

FIG. 9 is a schematic diagram of a structure of a prediction apparatus 900 for an autonomous driving manual takeover according to this application. The prediction apparatus 900 for the autonomous driving manual takeover provided in this application can be applied to the foregoing server. The prediction apparatus 900 for the autonomous driving manual takeover includes a receiving module 901, a determining module 902, and a sending module 903. The receiving module 901 may be configured to receive a first message from a first vehicle, where the first message includes information about a first location of the first vehicle and first time, the information about the first location is used to indicate a location of the first vehicle when the first vehicle detects that the first vehicle has a manual takeover requirement, and the first time is used to indicate time at which the first vehicle detects that the first vehicle has the manual takeover requirement; the determining module 902 may be configured to determine, based on the information about the first location and the first time, a first probability that a manual takeover occurs in a first area in which the first location is located within a first time range within which the first time falls; and the sending module 903 may be configured to send a second message to a second vehicle, where the second message includes the first probability, and the second message is used to indicate that a probability that the manual takeover occurs in the first area within the first time range is the first probability.

Optionally, the second message further includes information about the first area.

Optionally, the information about the first location includes latitude and longitude of the first location, and the determining module is further configured to: determine, based on the latitude and the longitude of the first location, that the first area is an intersection; and obtain coordinates of the intersection, where the information about the first area includes the coordinates of the intersection.

Optionally, the information about the first location includes latitude and longitude of the first location, and the determining module is further configured to: determine, based on the latitude and the longitude of the first location, that the first area is a road section; and obtain start point coordinates of the road section and end point coordinates of the road section, where the information about the first area includes the start point coordinates of the road section and the end point coordinates of the road section.

Optionally, the second message further includes an area type, and the area type includes a road section type or an intersection type.

Optionally, the information about the first location includes an identifier of an intersection, and the information about the first area includes the identifier of the intersection.

Optionally, the information about the first location includes an identifier of a road section and a distance from a start point of the road section to the first location, and the information about the first area includes the identifier of the road section and a preset area range of the road section.

Optionally, the information about the first location includes an identifier of a lane section and a distance from a start point of the lane section to the first location, and the information about the first area includes the identifier of the lane section and a preset area range of the lane section.

Optionally, the second message further includes an identifier type, and the identifier type includes a road type, a lane type, or an intersection type.

Optionally, the second message further includes a manual takeover probability identification code.

Optionally, the second message further includes the first time range.

Optionally, the sending module is further configured to send a manual takeover probability dynamic layer to the second vehicle, where the first area at the manual takeover probability dynamic layer is marked by using an identifier corresponding to the first probability.

The prediction apparatus for the autonomous driving manual takeover provided in this application may be configured to perform steps performed by the server in the foregoing method embodiments. An implementation principle and technical effects of the apparatus are similar to those in the foregoing method embodiments. Details are not described in this application again.

Figure 10:
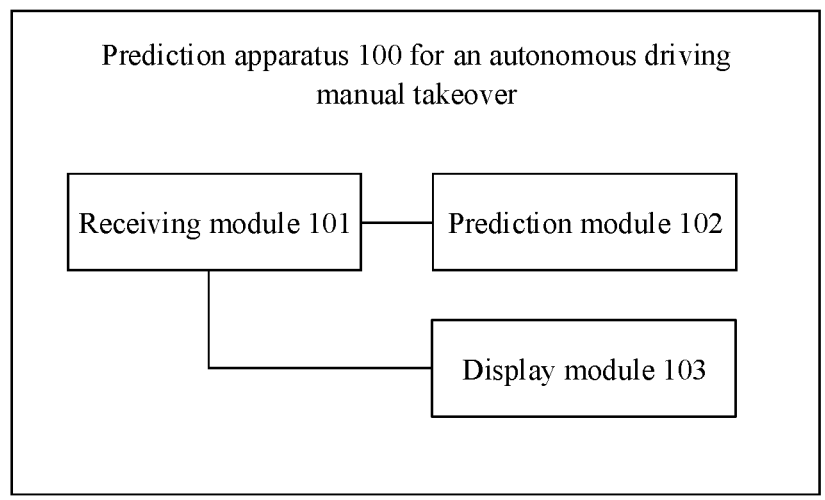
FIG. 10 is a schematic diagram of a structure of a prediction apparatus 100 for an autonomous driving manual takeover according to this application.

FIG. 10 is a schematic diagram of a structure of a prediction apparatus 100 for an autonomous driving manual takeover according to this application. The prediction apparatus 100 for the autonomous driving manual takeover provided in this application can be applied to the foregoing second vehicle. The prediction apparatus 100 for the autonomous driving manual takeover includes a receiving module 101 and a prediction module 102. The receiving module 101 may be configured to receive a second message from a server, where the second message includes a first probability that a manual takeover occurs in a first area in which a first location is located within a first time range within which first time falls, the first probability is determined by the server based on information about the first location and the first time, the information about the first location is used to indicate a location of a first vehicle when the first vehicle detects that the first vehicle has a manual takeover requirement, and the first time is used to indicate time at which the first vehicle detects that the first vehicle has the manual takeover requirement; and the prediction module 102 may be configured to perform manual takeover prediction when the first probability is greater than a preset threshold.

Optionally, the prediction apparatus for the autonomous driving manual takeover further includes a display module 103.

The receiving module 101 is further configured to receive a manual takeover probability dynamic layer from the server. The first area at the manual takeover probability dynamic layer is marked by using an identifier corresponding to the first probability; and the display module 103 is configured to display the manual takeover probability dynamic layer.

The prediction apparatus for the autonomous driving manual takeover provided in this application may be configured to perform steps performed by the second vehicle in the foregoing method embodiments. An implementation principle and technical effects of the apparatus are similar to those in the foregoing method embodiments. Details are not described in this application again.

Figure 11:
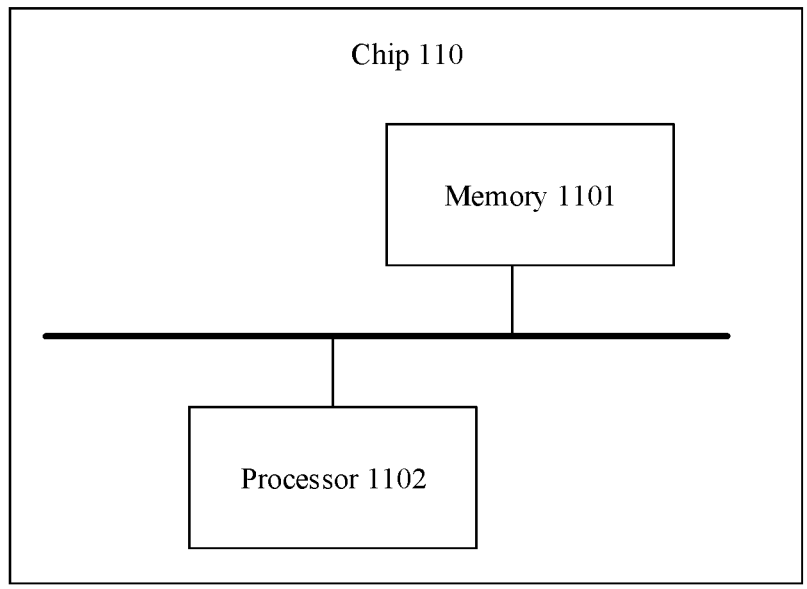
FIG. 11 is a schematic diagram of a hardware structure of a chip 110 according to this application.

FIG. 11 is a schematic diagram of a hardware structure of a chip 110 according to this application. As shown in FIG. 11, the chip 110 includes a memory 1101 and a processor 1102. The memory 1101 is configured to store program instructions. The processor 1102 is configured to invoke the program instructions in the memory 1101, to detect whether a first vehicle has a manual takeover requirement, and send a first message to a second vehicle when detecting that the first vehicle has the manual takeover requirement, so that after receiving the first message, the second vehicle may notify a driver of the second vehicle in advance that the vehicle may need to be manually taken over at a first location. In this way, the driver can get ready to take over the vehicle in advance, thereby improving vehicle driving safety. For details, refer to steps performed by the first vehicle in the foregoing method embodiments. Details are not described herein again.

Figure 12:
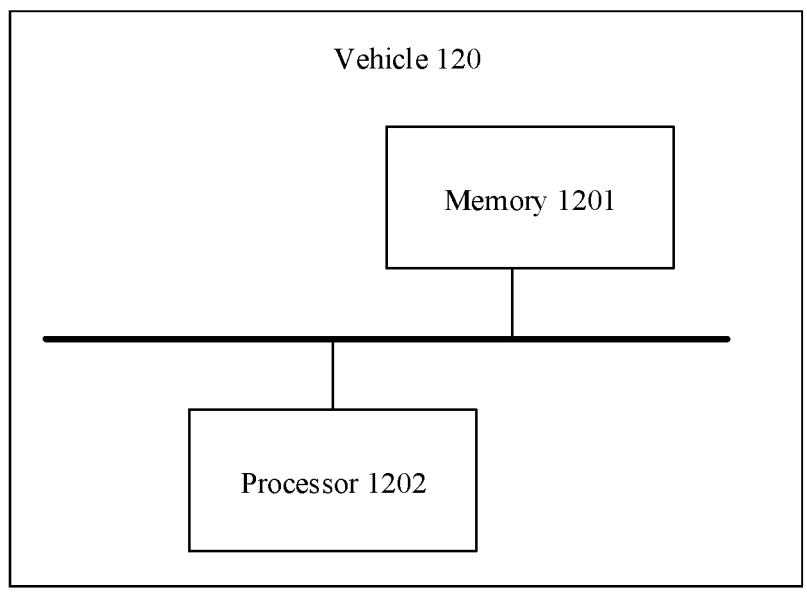
FIG. 12 is a schematic diagram of a hardware structure of a vehicle 120 according to this application.

FIG. 12 is a schematic diagram of a hardware structure of a vehicle 120 according to this application. As shown in FIG. 12, the vehicle 120 includes a memory 1201 and a processor 1202. The memory 1201 is configured to store program instructions. The processor 1202 is configured to invoke the program instructions in the memory 1201, to detect whether the vehicle 120 has a manual takeover requirement, and send a first message to a second vehicle when detecting that the vehicle 120 has the manual takeover requirement, so that after receiving the first message, the second vehicle may notify a driver of the second vehicle in advance that the vehicle may need to be manually taken over at a first location. In this way, the driver can get ready to take over the vehicle in advance, thereby improving vehicle driving safety. For details, refer to steps performed by the first vehicle in the foregoing method embodiments. Details are not described herein again. This application further provides a vehicle.

Figure 13:
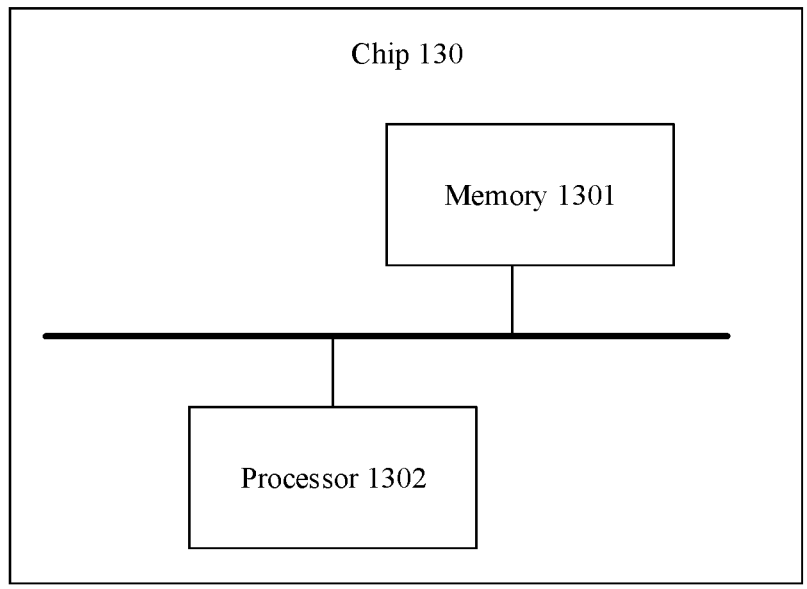
FIG. 13 is a schematic diagram of a hardware structure of a chip 130 according to this application.

FIG. 13 is a schematic diagram of a hardware structure of a chip 130 according to this application. As shown in FIG. 13, the chip 130 includes a memory 1301 and a processor 1302. The memory 1301 is configured to store program instructions. The processor 1302 is configured to invoke the program instructions in the memory 1301, to receive a first message from a first vehicle; determine, based on information about a first location and first time, a first probability that a manual takeover occurs in a first area in which the first location is located within a first time range within which the first time falls; and send a second message to a second vehicle. Then, after receiving the second message, the second vehicle may determine whether the first probability in the second message exceeds a preset threshold. If the first probability exceeds the preset threshold, the second vehicle reminds, in a voice broadcast form or the like, a driver of the vehicle that the manual takeover may occur at the first location. In this way, the driver gets ready for the takeover in advance, thereby improving driving safety.

Figure 14:
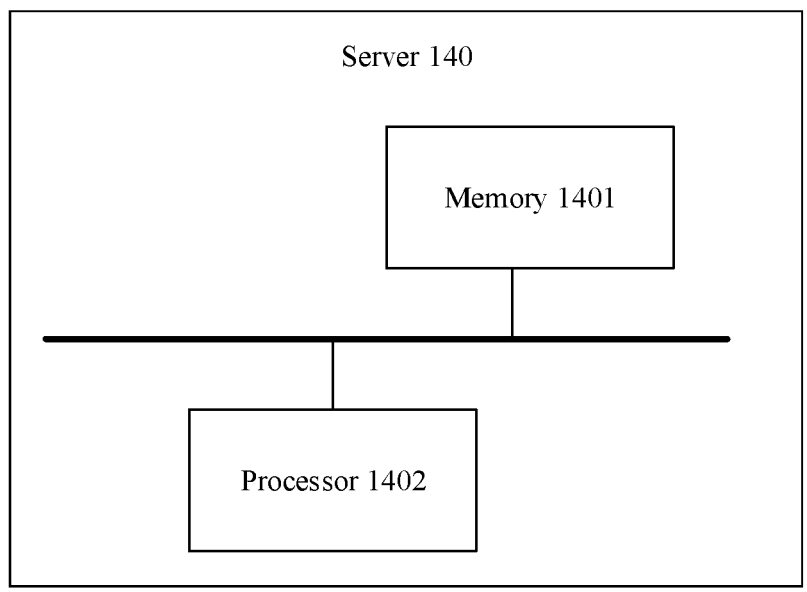
FIG. 14 is a schematic diagram of a hardware structure of a server 140 according to this application.

FIG. 14 is a schematic diagram of a hardware structure of a server 140 according to this application. As shown in FIG. 14, the server 140 includes a memory 1401 and a processor 1402. The memory 1401 is configured to store program instructions. The processor 1402 is configured to invoke the program instructions in the memory 1401, to receive a first message from a first vehicle; determine, based on information about a first location and first time, a first probability that a manual takeover occurs in a first area in which the first location is located within a first time range within which the first time falls; and send a second message to a second vehicle. Then, after receiving the second message, the second vehicle may determine whether the first probability in the second message exceeds a preset threshold. If the first probability exceeds the preset threshold, the second vehicle reminds, in a voice broadcast form or the like, a driver of the vehicle that the manual takeover may occur at the first location. In this way, the driver gets ready for the takeover in advance, thereby improving driving safety.

Figure 15:
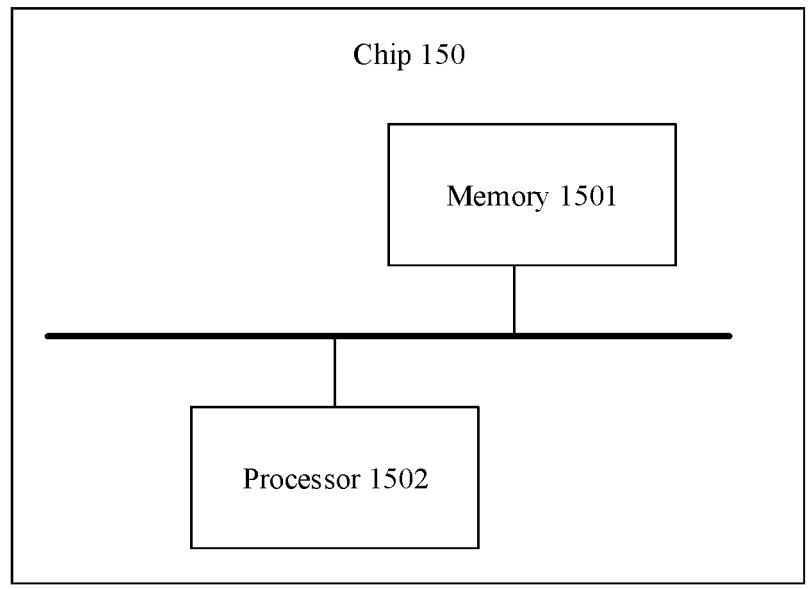
FIG. 15 is a schematic diagram of a hardware structure of a chip 150 according to this application.

FIG. 15 is a schematic diagram of a hardware structure of a chip 150 according to this application. As shown in FIG. 15, the chip 150 includes a memory 1501 and a processor 1502. The memory 1501 is configured to store program instructions. The processor 1502 is configured to invoke the program instructions in the memory 1501, to receive a second message from a server, where the second message includes a first probability that a manual takeover occurs in a first area in which a first location is located within a first time range within which first time falls; and perform manual takeover prediction when the first probability is greater than a preset threshold. In this way, a driver gets ready for the takeover in advance, thereby improving driving safety.

Figure 16:
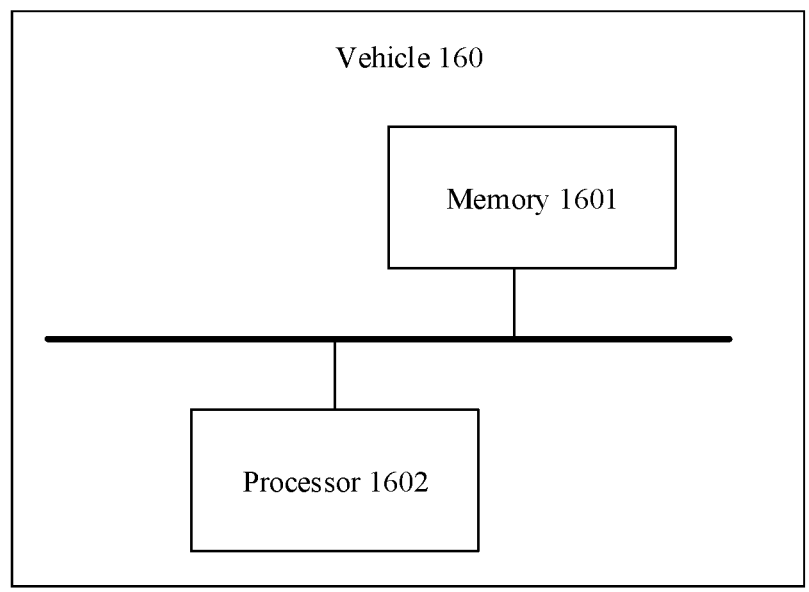
FIG. 16 is a schematic diagram of a hardware structure of a vehicle 160 according to this application.

FIG. 16 is a schematic diagram of a hardware structure of a vehicle 160 according to this application. As shown in FIG. 16, the vehicle 160 includes a memory 1601 and a processor 1602. The memory 1601 is configured to store program instructions. The processor 1602 is configured to invoke the program instructions in the memory 1601, to receive a second message from a server, where the second message includes a first probability that a manual takeover occurs in a first area in which a first location is located within a first time range within which first time falls; and perform manual takeover prediction when the first probability is greater than a preset threshold. In this way, a driver gets ready for the takeover in advance, thereby improving driving safety.

This application provides a prediction system, including the vehicle 120, the server 140, and/or the vehicle 160.

This application further provides a readable storage medium. The readable storage medium stores executable instructions. When at least one processor executes the executable instructions, steps on the first vehicle, the second vehicle, or the server side in the foregoing method embodiments are implemented. An implementation principle and beneficial effects of the readable storage medium are similar to those in the foregoing method embodiments. Details are not described herein again.

This application further provides a program product. The program product includes a computer program (that is, executable instructions), where the computer program is stored in a readable storage medium. A processor may read the computer program from the readable storage medium. The processor executes the computer program to implement steps on the first vehicle, the second vehicle, or the server side in the foregoing method embodiments. An implementation principle and beneficial effects of the program product are similar to those in the foregoing method embodiments. Details are not described herein again.

In the several embodiments provided in this application, it should be understood that the disclosed devices and methods may be implemented in other manners. For example, the described device embodiments are merely examples. For example, module division is merely logical function division and may be other division during actual implementation. For example, a plurality of modules may be combined or may be integrated into another system, or some features may be ignored or not be performed. In addition, the displayed or discussed mutual couplings or direct couplings or communication connections may be implemented through some interfaces. The indirect couplings or communication connections between the apparatuses or modules may be implemented in electrical, mechanical, or another form.

The modules described as separate parts may or may not be physically separate, and parts displayed as modules may or may not be physical units. To be specific, the parts may be located in one position, or may be distributed on a plurality of network units. Some or all of the modules may be selected depending on an actual requirement to achieve the objectives of the solutions of embodiments.

In addition, functional modules in embodiments of this application may be integrated into one processing unit, each of the modules may exist alone physically, or two or more modules are integrated into one unit. The unit integrated by the modules may be implemented in a form of hardware, or may be implemented in a form of hardware in addition to a software function unit.

The integrated module implemented in a form of a software function module may be stored in a computer-readable storage medium. The software function module is stored in a storage medium and includes several instructions for instructing a computer device (which may be a personal computer, a server, a network device, or the like) or a processor to perform some of the steps of the methods in embodiments of this application.

It should be understood that the processor may be a central processing unit (CPU), or may be another general purpose processor, a digital signal processor (DSP), an application-specific integrated circuit (ASIC), or the like. The general purpose processor may be a microprocessor, or the processor may be any conventional processor or the like. The steps of the methods disclosed with reference to this application may be directly implemented by a hardware processor, or may be implemented by a combination of hardware in the processor and a software module.

A memory may include a high-speed RAM memory, and may further include a nonvolatile memory (NVM), for example, at least one magnetic disk memory, or may be a USB flash drive, a removable hard disk, a read-only memory, a magnetic disk, an optical disc, or the like.

A bus may be an industry standard architecture (ISA) bus, a peripheral component interconnect (PCI) bus, an extended industry standard architecture (EISA) bus, or the like. Buses may be classified into an address bus, a data bus, a control bus, and the like. For ease of representation, the bus in the accompanying drawings in this application is not limited to only one bus or one type of bus.

All or some of the foregoing embodiments may be implemented by using software, hardware, firmware, or any combination thereof. When software is used to implement embodiments, all or some embodiments may be implemented in a form of a computer program product. The computer program product includes one or more computer instructions. When the computer program instructions are loaded and executed on a computer, all or some of the procedures or functions according to embodiments of this application are generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk solid state disk, SSD), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A prediction method for an autonomous driving manual takeover, comprising:
    sending, by a first vehicle, a first message to a second vehicle when the first vehicle detecting that the first vehicle has a manual takeover requirement, wherein the first message comprises information about a first location of the first vehicle, and the information about the first location indicates a location of the first vehicle when the first vehicle detects that the first vehicle has the manual takeover requirement, and wherein the first message indicates information about a time when the first vehicle has the manual takeover requirement, and wherein the first message comprises a takeover type that indicates whether a manual takeover is induced by an event or by a traffic flow.

2. The method according to claim 1, wherein the information about the first location comprises latitude and longitude of the first location.

3. The method according to claim 1, wherein when the first location is at an intersection, the information about the first location comprises an identifier of the intersection.

4. The method according to claim 1, wherein when the first location is in a road section or a lane section, the information about the first location comprises an identifier of a road section in which the first location is located and a distance from a start point of the road section to the first location, or an identifier of a lane section in which the first location is located and a distance from a start point of the lane section to the first location.

5. The method according to claim 3, wherein the first message further comprises an identifier type, and the identifier type comprises a road type, a lane type, or an intersection type.

6. The method according to claim 1, wherein the first message further comprises a manual takeover identification code.

7. A prediction method for an autonomous driving manual takeover, applied to a server, wherein the method comprises:
    receiving, by the server, a first message from a first vehicle, wherein the first message comprises information about a first location of the first vehicle and first time, the information about the first location indicates a location of the first vehicle when the first vehicle detects that the first vehicle has a manual takeover requirement, and the first time indicates time when the first vehicle detects that the first vehicle has the manual takeover requirement;
    determining, by the server based on the information about the first location and the first time, a first probability that a manual takeover occurs in a first area in which the first location is located within a first time range within which the first time falls; and
    sending, by the server, a second message to a second vehicle, wherein the second message comprises the first probability, and the second message indicates that a probability that the manual takeover occurs in the first area within the first time range is the first probability.

8. The method according to claim 7, wherein the second message further comprises information about the first area.

9. The method according to claim 8, wherein the information about the first location comprises latitude and longitude of the first location, and the method further comprises:
    determining, based on the latitude and the longitude of the first location, that the first area is an intersection; and
    obtaining coordinates of the intersection, wherein the information about the first area comprises the coordinates of the intersection.

10. The method according to claim 8, wherein the information about the first location comprises latitude and longitude of the first location, and the method further comprises:
    determining, based on the latitude and the longitude of the first location, that the first area is a road section; and
    obtaining start point coordinates of the road section and end point coordinates of the road section, wherein the information about the first area comprises the start point coordinates of the road section and the end point coordinates of the road section.

11. The method according to claim 9, wherein the second message further comprises an area type, and the area type comprises a road section type or an intersection type.

12. The method according to claim 8, wherein the information about the first location comprises an identifier of an intersection, and the information about the first area comprises the identifier of the intersection.

13. The method according to claim 8, wherein the information about the first location comprises an identifier of a road section and a distance from a start point of the road section to the first location, and the information about the first area comprises the identifier of the road section and a preset area range of the road section.

14. A prediction apparatus for an autonomous driving manual takeover, comprising:
    at least one processor; and
    a non-transitory computer-readable storage medium coupled to the at least one processor and storing programming instructions, that when executed by the at least one processor, cause the apparatus to:

send, by a first vehicle, a first message to a second vehicle when detecting that the first vehicle has a manual takeover requirement, wherein the first message comprises information about a first location of the first vehicle, and the information about the first location indicates a location of the first vehicle when the first vehicle detects that the first vehicle has the manual takeover requirement, and wherein the first message indicates information about a time when the first vehicle has the manual takeover requirement, and wherein the first message comprises a takeover type that indicates whether a manual takeover is induced by an event or by a traffic flow.

15. The prediction apparatus according to claim 14, wherein the information about the first location comprises latitude and longitude of the first location.

16. The prediction apparatus according to claim 14, wherein when the first location is in a road section or a lane section, the information about the first location comprises an identifier of a road section in which the first location is located and a distance from a start point of the road section to the first location, or an identifier of a lane section in which the first location is located and a distance from a start point of the lane section to the first location.

17. The prediction apparatus according to claim 14, wherein the first message further comprises an identifier type, and the identifier type comprises a road type, a lane type, or an intersection type.

18. The prediction apparatus according to claim 14, wherein the first message further comprises a manual takeover identification code.

* * * * *

UNITED STATES PATENT AND TRADEMARK OFFICE
CERTIFICATE OF CORRECTION

PATENT NO. : 12,175,867 B2
APPLICATION NO. : 17/961108
DATED : December 24, 2024
INVENTOR(S) : Dezhi Qiao, Yong Wu and Jianqin Liu Page 1 of 1

It is certified that error appears in the above-identified patent and that said Letters Patent is hereby corrected as shown below:

In the Claims

In Column 24, In Line 8, In Claim 7, after "and" insert -- a --.

In Column 24, In Line 12 (Approx.), In Claim 7, after "indicates" insert -- a --.

Signed and Sealed this
Twenty-fifth Day of March, 2025

Coke Morgan Stewart
*Acting Director of the United States Patent and Trademark Office*